United States Patent
Czichy et al.

(10) Patent No.: US 6,297,897 B1
(45) Date of Patent: *Oct. 2, 2001

(54) METHOD AND ARRANGEMENT FOR OPTICAL INFORMATION TRANSMISSION VIA SATELLITES

(75) Inventors: Reinhard Hanno Czichy, Eggersriet (CH); Manfred Wittig, Lisse (NL); Edgar Fischer, Muellheim Dorf (CH)

(73) Assignee: Contraves Space AG, Zurich (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,586

(22) Filed: Mar. 6, 1998

(30) Foreign Application Priority Data

Mar. 7, 1997 (CH) .................................... 0548/97

(51) Int. Cl.$^7$ .................................................. H04B 10/00
(52) U.S. Cl. ............................................ 359/172; 359/159
(58) Field of Search ................... 359/172, 159, 359/152, 183, 173

(56) References Cited

U.S. PATENT DOCUMENTS

| | | | | |
|---|---|---|---|---|
| 3,504,182 | * | 3/1970 | Pizzurro et al. ................. | 359/159 |
| 3,511,998 | * | 5/1970 | Smokler ............................ | 359/159 |
| 3,566,126 | * | 2/1971 | Lang et al. ....................... | 359/193 |
| 4,025,783 | * | 5/1977 | Fletcher et al. ................. | 359/194 |
| 4,867,560 | * | 9/1989 | Kunitsugu ....................... | 356/152 |
| 5,119,225 | * | 6/1992 | Grant et al. ..................... | 359/172 |
| 5,142,400 | * | 8/1992 | Solinsky ......................... | 359/172 |
| 5,218,467 | * | 6/1993 | Ross et al. ...................... | 359/172 |
| 5,475,520 | * | 12/1995 | Wissinger ....................... | 359/172 |
| 5,544,843 | | 8/1996 | Johnson .......................... | 244/3.11 |
| 5,592,320 | * | 1/1997 | Wissinger ....................... | 359/172 |
| 5,841,592 | | 11/1999 | Herren et al. ................... | 359/819 |
| 5,923,452 | * | 7/1999 | Carlson .......................... | 359/172 |
| 5,974,074 | | 10/1999 | Mayor et al. .................... | 372/106 |
| 5,978,121 | | 11/1999 | Fischer et al. .................. | 359/156 |
| 5,991,062 | | 11/1999 | Fischer et al. .................. | 359/191 |

FOREIGN PATENT DOCUMENTS 2 690 585   10/1993 (FR).

OTHER PUBLICATIONS

IEE Proceedings J. Optoelectronics, Baister et al. SOUT optical intersatellite communication terminal elegant breadboard pp. 279–287.

Proceedings of the SPIE vol. 2381 Lightweight, high–data–rate laser communications terminal for low–Earth–orbit satellite constellations pp. 77–82.

James E. Freidell Commerical opportunities, versus government programs, will likely drive the future of laser communications SPIE vol. 2699 pp. 2–9.

Begeley et al. Proposed near–term, IGbps space laser communications demonstration system SPIE vol. 2699 pp. 24–37.

Fritz et al. Photonics Space Experiment on–orbit results SPIE vol. 2811 pp. 106–115.

(List continued on next page.)

Primary Examiner—Kinfe-Michael Negash
(74) Attorney, Agent, or Firm—Townsend and Townsend and Crew LLP

(57) ABSTRACT

The instant invention relates to a method and an arrangement for optical information transmission via satellites by means of broadband optical modulation and reception technology. As a rule, the arrangement is realized in optical satellite terminals, which have optical units, a laser unit, control and supply as well as monitoring units. In the exemplary embodiment, these terminals are designed for a data rate of 1.5 Gbit/s and a transmission distance of more than 1,200 km, while having a weight of less than 8 kg.

10 Claims, 14 Drawing Sheets

OTHER PUBLICATIONS

Araki et al. Performance evaluation of laser communication equipment onboard ETS–VI satellite SPIE vol. 2699 pp. 52–59.

Toni Tolker Nielson Pointing, Acquisition and tracking system for the Free Space Laser Communication System SINEX SPIE vol. 2381 pp. 194–205.

Lambert et al. *Laser Communications in Space*, Chapter 10 pp. 279–294.

Manfred Witting Optical space communication: How to realize the second generation of small optical terminals ISO Press, 1994, pp. 55–89.

* cited by examiner

METHOD AND ARRANGEMENT FOR OPTICAL INFORMATION TRANSMISSION VIA SATELLITES

FIELD OF THE INVENTION

The instant invention relates to a method for optical information transmission via satellites by means of broadband optical modulation and reception technology. It also relates to an arrangement for executing this method.

BACKGROUND OF THE INVENTION

The direct link between satellites for the transmission of information signals was initiated approximately 20 years ago and to this date almost exclusively employs radio frequencies (RF). The expansion of the commercial satellite industry by means of multi-satellite programs such as IRIDIUM (Iridium, Inc.), TELEDESIC (Teledesic Company), SPACE-WAY/GALAXY (Hughes) and others represents a technological evolution of a scope not seen up to now, in particular in connection with mobile radio communications. The placement of several thousand inter-satellite terminals in space is planned in connection with this. Although as a rule the use of 60 GHz RF links is planned, tests employing laser technology have also become known.

In contrast to the technologically mature and commercially wide-spread optical communication by means of glass fibers, the satellite laser communication is still in the research and development phase. The advantages of a laser communication in contrast to RF communication, however, are

- a high transmission capacity up to the multi-Gbit range, thanks to the laser light frequency which is greater by approximately four tens, compared with microwaves,
- high immunity to interferences,
- solution to the RF problem of congestion of the electromagnetic spectrum,
- small antennas,
- small, compact and light on-board terminals, possibility of miniaturization thanks to integrated and diffractive optical devices, compact laser sources and laser arrays,
- low electrical power requirements.

In spite of these advantages, a demonstration of dependably operating on-board terminals has not succeeded so far. Laser transmissions would have the potential of presenting successful solutions to the rapidly increasing requests for transmission capacity. Even though many efforts for optical satellite linkage have been started since the realization of the first laser in 1960, none of them were successfully technically completed (James E. Freidell "Commercial Opportunities, Versus Government Programs, will likely drive the Future of Laser Communications" in "Free Space Laser Communications" VIII, G. Stephen Mecherle, ed., Proc. SPIE 2699, pp. 2 to 9, 1996).

Up to now, all important space agencies have been operating with demonstration projects for laser links, which in general were intended to research all aspects of communications with satellites in low earth orbits (LEO), in geostationary positions (GEO) and for the linkage with ground stations and with aircraft. For example, the US Space Agency NASA has ordered an impressive number of projects since the sixties, none of which, however, did reach an operational status because of technical difficulties. At present, the most important endeavor is the demonstration system for laser communications (LCDS), which represents a practical feasibility study for the optical information transmission between LEO, GEO, ground and aircraft terminals (D. L. Begley et al., "Proposed Near-Term 1 Gbps Space Laser Demonstration System", in "Free Space Laser Communications" VIII, G. Stephen Mecherle, ed., Proc. SPIE 2699, pp. 24 to 37, 1996).

LCDS was intended to prove the advantages of the laser link over RF technology, namely in relation to dimensions, weight, output and costs at very high bit rates of up to 1 Gbit/s. In accordance with these ideas, the weight of the laser terminal was to be limited to less than 40 kg, with a power requirement of less than 100 W. Monolithic laser diode arrays with wavelengths in the range between 810 and 860 nm and an optical output up to approximately 1.2 W are used in the optical transmitter, and also take care of pointing, acquiring and tracking the partner satellite. The optical reception includes a CCD (charged couple device) array and a quadrant avalanche photodiode detector (APD) for pointing, acquiring and tracking, and a further APD detector for receiving the broadband information signals. Nonreturn-to-zero (NRZ) signals are used for the communication channels in accordance with the principle of laser intensity modulation and direct photodiode detection (IM-DD) (M. E. Fritz et al., "Photonics Space Experiment On-Orbit Results" in "Photonics for Space Environment" IV, Edward W. Taylor, ed., Proc. SPIE 2811, pp. 106 to 114, 1996).

In accordance with the above cited US endeavor, it is disadvantageous that the possibilities of modern laser technology have not been fully exhausted by far, because this concept is based on classical diode laser technology and does not take into consideration either the neodymium laser sources or the more efficient method of coherent communications.

The Japanese ETS VI satellite which, although it missed the planned geostationary orbit, went into a large elliptical orbit, carried a 22 kg laser terminal using a diode laser (wavelength 830 nm) for the downlink at 1.024 Mbit/s, in which a telescope with a diameter of 7.5 cm, a CCD sensor and a quadrant detector have been installed, and which uses an avalanche photodiode for optical reception (K. Akari et al. "Performance Evaluation of Laser Communication Equipment On-Board the ETS-VI Satellite", in "Free Space Laser Communications" VIII, G. Stephen Mecherle, ed., Proc. SPIE 2699, pp. 52 to 59,1996).

Transmission is based on the classic principle of IM-DD. The ground station in Tokyo uses a 10 W argon-ion laser of 514.5 nm and a modulation bit rate in NRZ format of 1.024 Mbits/s.

A further satellite (OICETS), planned for 1998, is intended to carry an improved laser terminal being completed at this time. The idea is to provide a connecting link between the Japanese satellite and the European optical SILEX experiment with the planned satellite ARTEMIS (geostationary) and SPOT4 (low orbit). The terminal is intended to include two redundant diode lasers of 850 nm and 100 mW average optical modulating output, a bit rate of 49 Mbit/s, in NRZ format, and an APD receiver, and to employ the method of intensity-modulation-direct detection. The optical portion of the terminal is intended to weigh 100 kg, the associated electrical portion 40 kg, the required optical output 480 W during the acquisition phase (0.3 s), and 300 W during the communication phase. The goal of the experiments is to test the practical feasibility of the optical inter-satellite link (ISL) for pointing, acquiring and tracking of satellites as well as for data communication.

The fact that the Japanese endeavor, although it represents only a problem definition if it were to be carried out, merely utilizes only classical optical and opto-electronic components and modulating methods, is disadvantageous in this connection, so that therefore any innovative step is lacking. For this reason the transmission capacity is limited and it should be difficult to demonstrate the advantages of optical communications with the photonic hardware employed. The plus of the experiment would be the fact that the optical terminal is already in orbit and first measurements have been taken.

The already previously mentioned SILEX experiment is a further project of the European Space Agency (ESA), whose goal is the implementation and testing of a laser communications transmission system for satellites. The implementation of this project is expected to occur by the end of this century (Toni Tolker Nielsen, "Pointing, Acquisition and Tracking System for Free Space Laser Communication System" in Proc. SPIE 2381, pp. 194 to 205, 1995).

The optical SILEX terminal uses diode lasers of a wavelength between 800 and 800 nm and with a bit rate of 2.048, or respectively 50 Mbit/s for the forward or respectively return connection. It is intended to transmit over up to approximately 45,000 km and have an electrical power requirement between 160 to 180 W. The relatively large dimension and the large weight of this terminal have led the ESA to order the construction of a small optical terminal (SOUT), which is intended to find space in an LEO satellite in order to take over the communication with a GEO satellite. Various bit rates are being tested, as a rule they depend on the emitted output of the diode lasers, which can lie between 50 mW and 1 W, if it is possible to assure a sufficiently long service life of the new high output laser diodes. When using such diodes, the bit rate in the NRZ communications format should be some Mbit/s. In any case, there is the expectation for SOUT to have a weight below 25 kg at 40 W power usage, which would represent a clear improvement over the first SILEX terminal version. But a further development with the designation SOTT is also already being tested, which is intended as a link between geostationary satellites at bit rates of several Mbit/s.

Technological developments in the field of the optical components and the laser sources during the last year result in problem definitions and therefore lead to the expectation of a continuous improvement of the properties of laser terminals. The appearance of monomode diode lasers of high optical output and of laser arrays permits the design of compact terminals with telescope diameters of approximately one inch. Thanks to diffractive optical devices and modern optical design, the total number of optical components can be greatly reduced, which results in a clear improvement in respect to weight, volume and dependability (Manfred Wittig "Optical Space Communications: How to Realize the Second Generation of Small Optical Terminals", IOS Press, Space Communications, pp. 55 to 89, 1994).

With this proposed terminal, diode lasers are employed for communication and for pointing, acquiring and tracking (PAT) the partner satellite. The PAT sub-system is a central component of an optical satellite link. The complexity of PAT is based on the requirement of locating a satellite from another one over distances of thousands of kilometers and at a beam divergence of a few millimeters. Mechanical vibrations of the transmitter and noise because of background radiation increase the bit error rate (BER) and therefore decrease accuracy and dependability. The new developments foresee a two-step pointing mechanism in order to achieve a large dynamic range. An additional diode laser beam of several Watt output can take over the job of detection, if it is guided in the form of a guide ray through a small telescope of approximately 5 mm diameter, which is mounted next to the main telescope. The tracking mechanism must have high immunity against interference by the background radiation, for example sunlight. The challenge of realizing a dependable functioning optomechanical structure for PAT lies in developing very low-vibration optical-mechanical devices, which at the same time are very light and small and require extremely low electrical output for controlling the optical devices and for electronic signal processing.

As the above cited problem definitions and remarks show, the next generation of communication satellites requires broadband, digital signal processing on board, in contrast to the present prior art, which in principle is a simple relay technology. Furthermore, solutions based on refined optical devices are lacking. Also, no solutions employing small and handy laser sources of high radiation output, such as diode-pumped neodymium-YAG lasers, are known. The latest work in this field by ESA attempts to treat outstanding questions by means of modern technology. However, in accordance with the sources in the prior art as cited above, it is unmistakable that no known problem definitions for developing laser communication links between LEO or GEO satellites and ground stations disclose a total solution which would be in a position to end in a product representing a real alternative in respect to the dominating RF technology in this field (Stephen G. Lambert and William L. Casey "Laser Communications in Space", Artech House 1995, pp. 279 to 294).

OBJECT AND SUMMARY OF THE INVENTION

It therefore is the object of the instant invention to overcome the disadvantages of the prior art and to disclose a method and a device for optical information transmission via satellites, wherein an efficient satellite which is highly dependable for space communication can be used, and in the process to make sure that both the required redundancy and the lowest possible power requirements are made available.

In accordance with the invention, this object is attained in that the terminal is equipped with
- a diode laser for communication and pointing, acquisition and tracking,
- an optical system of a two-mirror application for providing a two-stage pointing and alignment device for the purpose of aligning the transmitting and receiving beams,
- the combination of hybrid optical components, diffractive elements as well as refractive/reflective components,
- a control of the optical alignment by means of coherent superimposed reception,
- an optical phase modulation by means of semiconductor amplifiers,
- a transmission bit rate from>100 Mbit/s to 1.5 Gbit/s, preferably 1.5 Gbit/s, and a transmission distance from>500 m up to 4,500 km, preferably 1,200 km.

The terminal in accordance with the invention is an integrated concept for a novel, light, small, compact and dependable optical satellite terminal. A structure was successfully worked out which unites all advantages of modern laser technology and optics, as well as of broadband digital optical modulation and receiving technology.

The optical aperture for the transmission and reception of monomode modulated laser light for multi-channel operation is less than 40 to 50 mm, preferably 50 mm, and is composed of a two- mirror special device with coarse/fine adjustment for the almost hemispheric pointing and tracking of the partner terminal, a quasi monolithic optical bench containing all optical and opto-electronic components required for operation, and a separate electronic unit for communication and the control of the terminal.

The optical bench has passive temperature stabilization, thanks to the use of a ceramic glass material with a small coefficient of expansion, or of other materials which compensate the temperature-related changes of the characteristics of optical components.

Diffractive optical components with or without additional refractive or reflective elements in the terminal take over the shaping of the transmitted beams, or respectively the received light.

The optical terminal itself contains a hybrid combination of a pointing sensor and receiver.

The invention will be explained in more detail below by means of detailed exemplary embodiments by means of FIGS. 1 to 14.

DETAILED DESCRIPTION OF THE PREFERRED EMBODIMENTS

Figure 1:
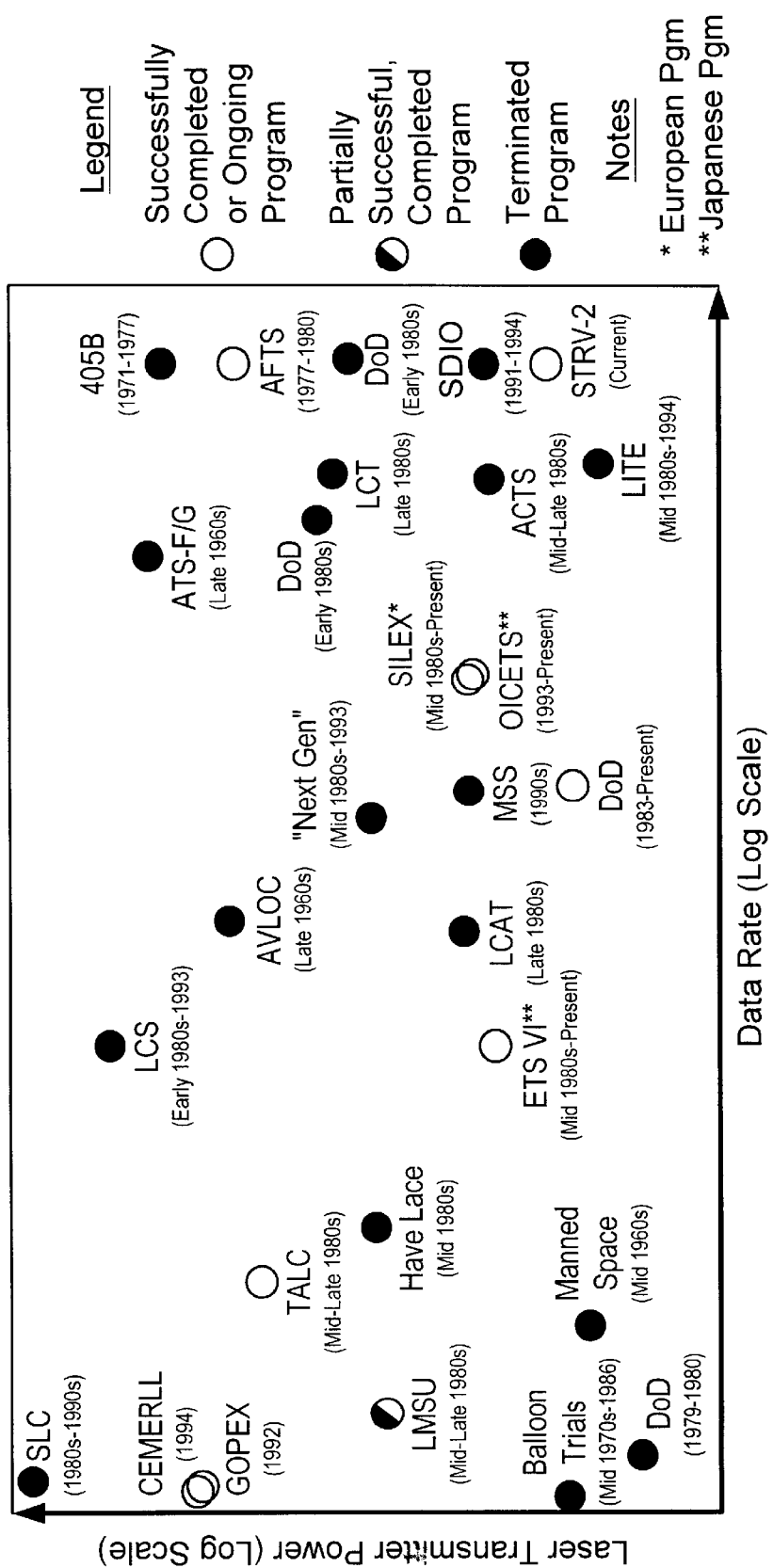
FIG. 1 represents a development diagram of the prior art in satellite communications.
Figure 2:
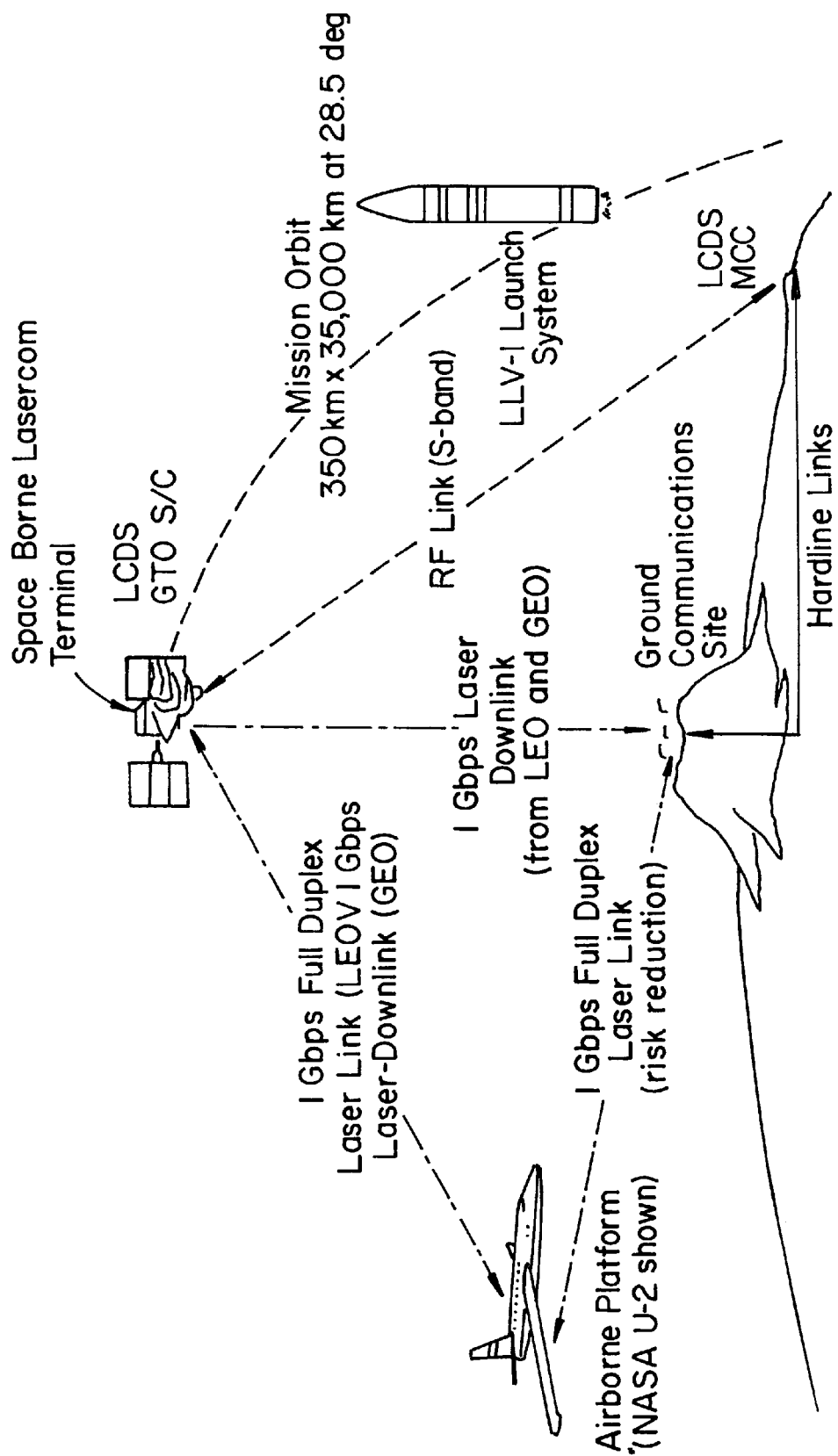
FIG. 2 is a basic diagram of a comparison between LCDS system configuration and RF technology.
Figure 3:
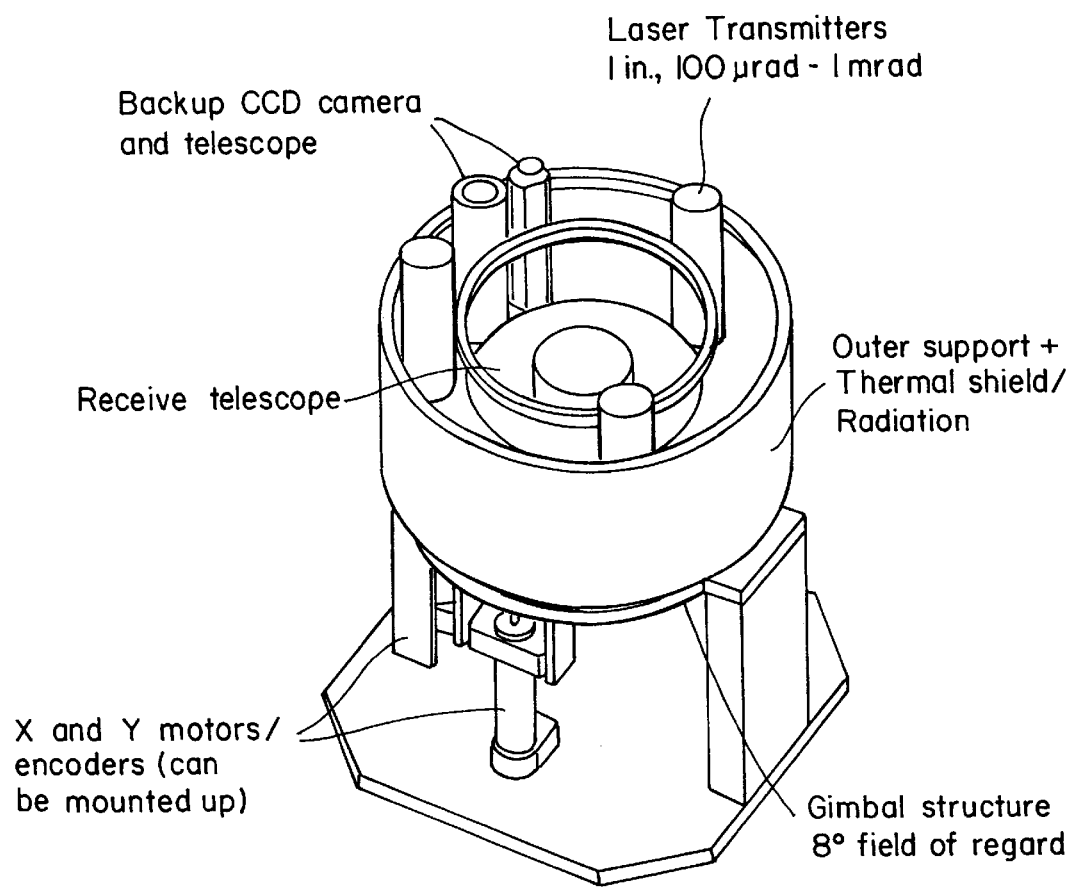
FIG. 3 shows the opto-mechanical structure of an optical terminal in accordance with the prior art.
Figure 4:
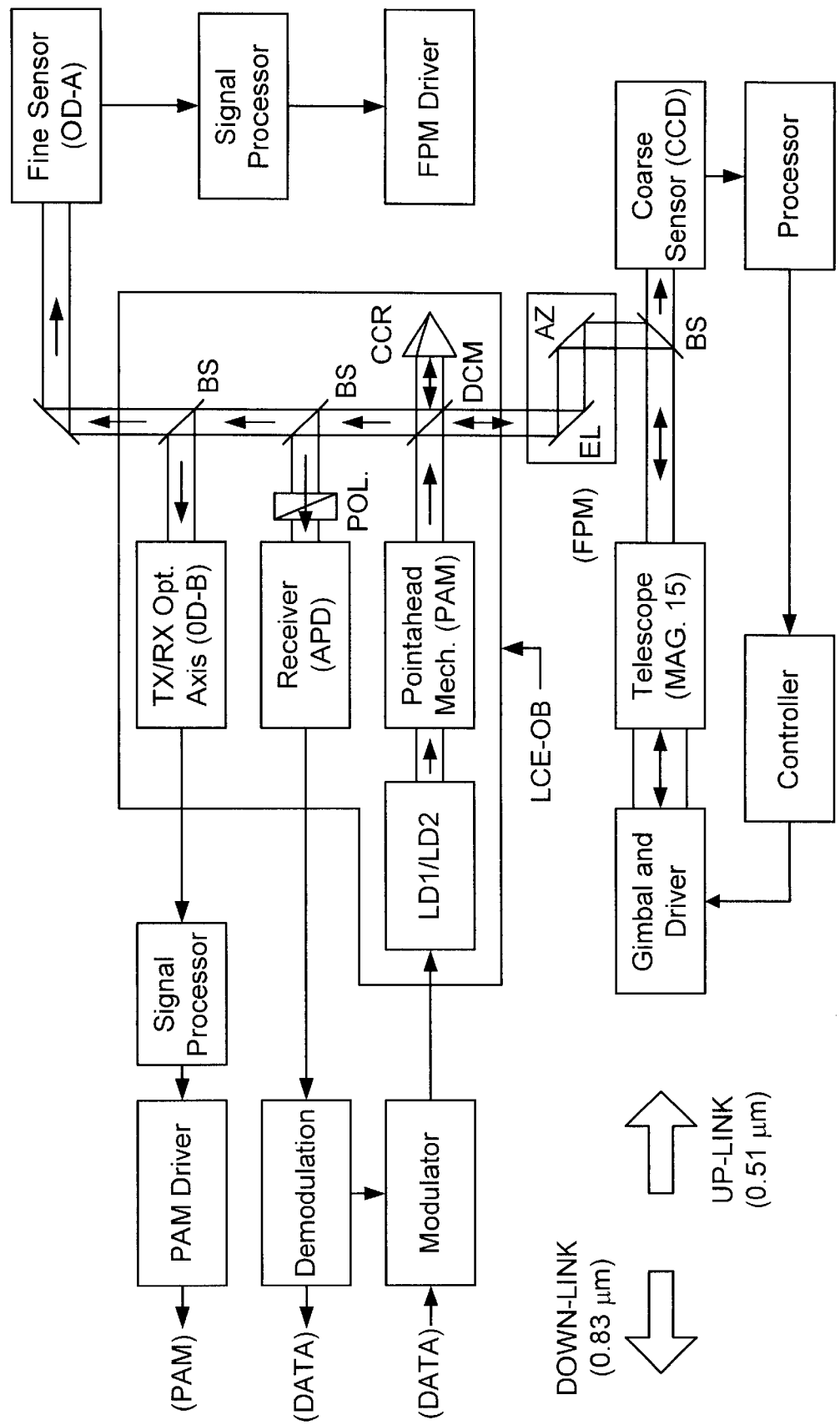
FIG. 4 is a block diagram of an LCE system in accordance with the prior art.
Figure 5:
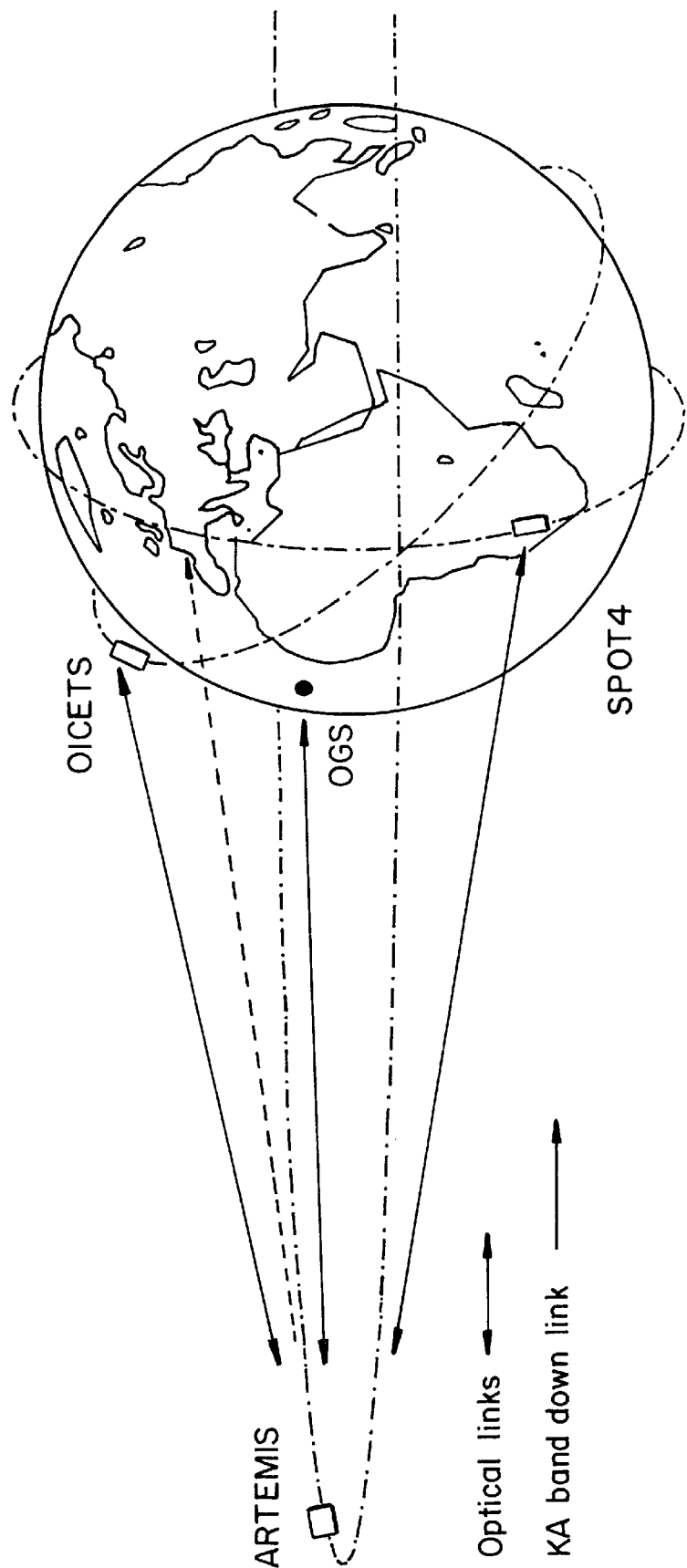
FIG. 5 shows the European SILEX scenario.

FIGS. 1 to 5 show the developments and trends which reflect the world-wide efforts of using space by means of and for satellite laser communications. The individual systems (LCDS, LCE and SILEX) have been extensively discussed above and the disadvantages of these systems have been brought out. In particular, the continuously growing volume in the amount of transmitted data between satellites and ground stations, and the enormous requirement in transmission capacity becoming apparent has shown the way, that a solution can only be provided with the coming use of many satellites for the world-wide area-covering takeover of communications channels, for example in the case of mobile radio.

The laser information transmission in accordance with the invention is a technology with a great potential for applications in satellite communications. Although this technology has clear advantages over the radio frequency technology (RF) dominating the prior art, and could lead to improvements of serious consequence in the airborne terminals, so far it has not been successful in actually converting these advantageous into practical technological realizations.

The essential disadvantage of the prior art is that up to now only partial aspects of the employment of laser communications have been treated. This had the result that the solutions presented did not permit the consideration of the entire complexity of questions, so that the advantages of laser technology in relation to RF technology could not be convincingly expressed. As represented in the subsequent FIGS. 6 to 14, the terminal in accordance with the invention discloses a complete solution of the employment of laser communications for satellite linkage, which brings together practically all advantages of optical technology. This was made possible thanks to the novel optical design and directed optimization in the employment of optical, mechanical and photonic components in combination with appropriate signal processing methods.

The essential characteristics are:

Bit rate: >100 Mbit/s to 1.5 Gbit/s, preferably 1.5 Gbit/s

Weight of the optical head: approximately 8 kg

Dimensions of the optical head: approximately 415×230× 181 mm

Transmission distance: >500 m up to 4,500 km, preferably 1,200 km

Power usage less than 40 W, service life longer than 10 years.

This terminal has a very large transmission capacity in the Gbit/s range, along with low weight and small dimensions which, in the end, results in its suitability for space applications. Therefore the prerequisites for installation and operation in connection with future communications satellites are present.

The high digital modulation rate was achieved by applying the principle of coherent transmission, as extensively explained in Swiss patent application No. 2307/96. This type of modulation is distinguished by a considerable increase of the detecting sensitivity of the optical receiver, and permits the dependable reception and processing of weak optical signals from a far distant partner satellite at a low bit error rate (BER).

The small dimensions and low weight were achieved by the consequent application of a newly developed concept of the thermal separation of appropriate components. In addition, this concept employs an intelligent combination of hybrid optical components, diffractive elements as well as refractive/reflective components, all of which are mounted and adjusted on a sturdy optical bench. Because of this, the number of optical components is reduced on the one hand and, on the other hand, a very compact optical head is realized, which is insensitive to vibrations, functions dependably, makes the installation in a satellite easier and assures high dependability.

Figure 6:
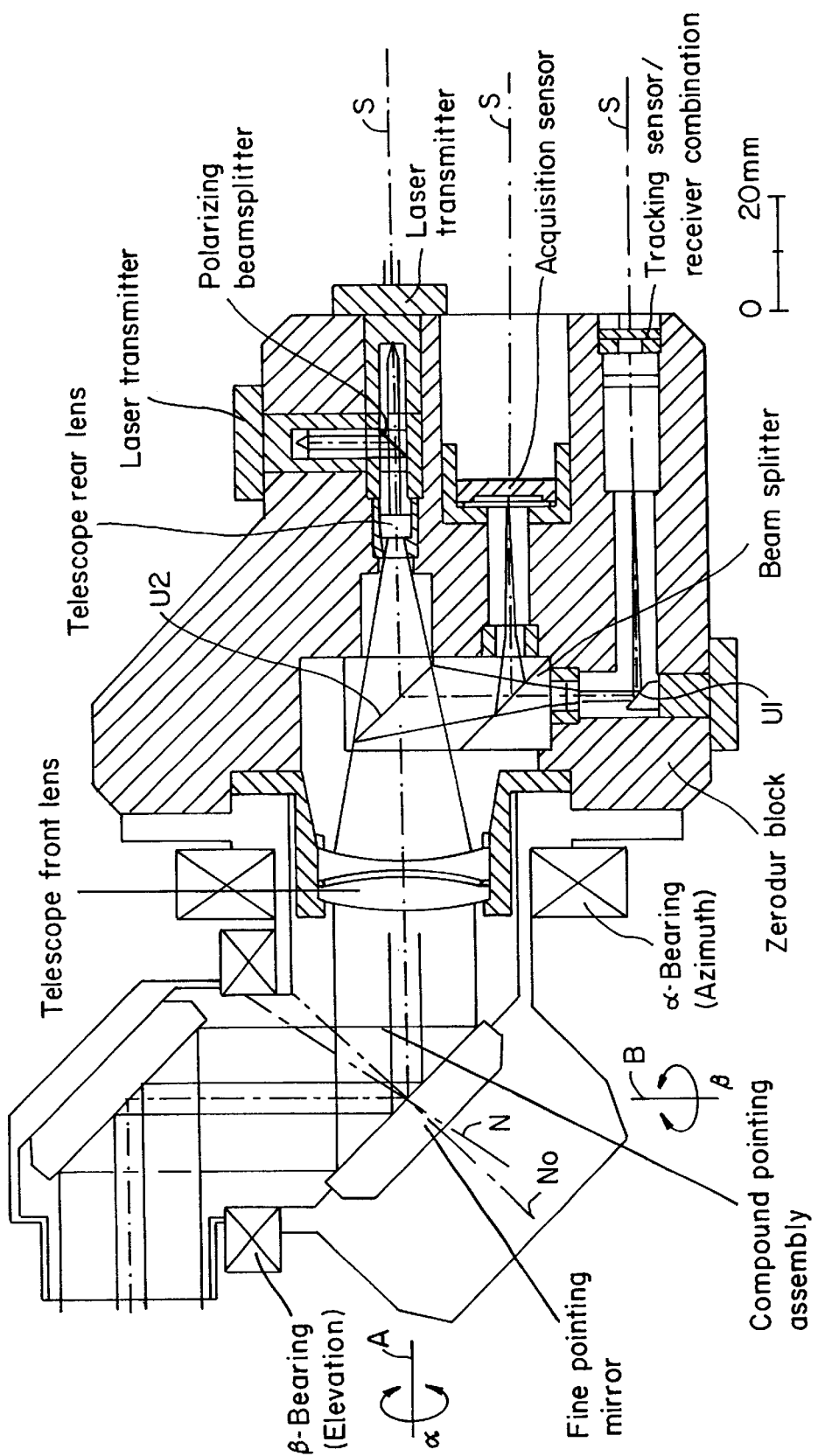
FIG. 6 represents the schematic structure of an optical terminal as used in accordance with the invention.

FIG. 6 shows a pointing, or respectively aligning device of an optical terminal used for aligning optical transmission beams from the terminal with optical receiving beams from a counter-terminal, so that a connection for the exchange of data is made. The pointing, or respectively alignment process takes place in two partial processes: in a first partial process a strong beam is transmitted, which can be easily detected by the counter-terminal, and simultaneously the correspondingly strong beam from the counter-terminal is detected, or respectively acquired by actuation of the rough setting of the pointing, or respectively alignment device, so that the link can be made in a first approximation, so to speak. Subsequently the linkage of the terminal with the counter-terminal is adjusted and tracked by actuating a fine adjustment device. Thus the entire pointing and alignment device can also be called a multiple or compound pointing device and is described in detail, for example in an extensive exemplary embodiment in Swiss patent application No. 2988/96.

During the acquisition phase, the laser transmitter for beaming out the strong beam from the terminal, and the acquisition sensor (AS) of the counter-terminal for acquiring the strong signal are active. During the actual linkage, the laser transmitter for beaming out the signals and the tracking sensor, or respectively the receiver or reception combination are active.

For rough adjustment, the entire pointing, or respectively aligning device rotates around the azimuth shaft A, and in addition, the actual transmitting and receiving element rotates around the elevation shaft B. The azimuth shaft A essentially extends parallel with the direction of the transmission and receiving beams during the linkage, the respective azimuth angle is identified by α, and the azimuth shaft A is seated in the a bearing. The elevation shaft B is oriented perpendicularly in respect to the azimuth shaft A, the respective elevation angle with B and the elevation shaft B is seated in the b bearing.

An example of an optical bench will be described in what follows, making reference to FIG. 11; the optical bench contains individual optical units, whose axes extend parallel with the direction of the received beam, or respectively the direction of the shaft A.

The above described components of the pointing, or respectively aligning device permit an adjustment within a very large spatial angle of approximately one hemisphere, because the rotation around the azimuth shaft A is 360° and the rotation around the elevation shaft B is 180°.

After the process of rough alignment is finished, fine alignment takes place exclusively with the aid of the exterior mirror unit. Its actual mirror is suspended in such a way that it can be tilted by a small amount, so that the geometric location of its respective normal axis N (FIG. 6) forms a cone with a very small opening angle with its original normal axis No, which corresponds to the spatial angle of the possible fine adjustment. Accordingly, only a slight mass, namely the second mirror unit, needs to be moved with this fine alignment, so that it can be performed comparatively rapidly and at low energy.

Furthermore, a telescope rear lens and a telescope front lens are arranged in the described pointing, or respectively aligning device. In addition, a polarizing beam splitter is arranged in the beam path of the laser transmitter in such a way that it is possible to emit an additional laser beam transversely to the laser beam in the direction S. A further beam splitter is arranged between the first and second reversing direction.

Figure 7:
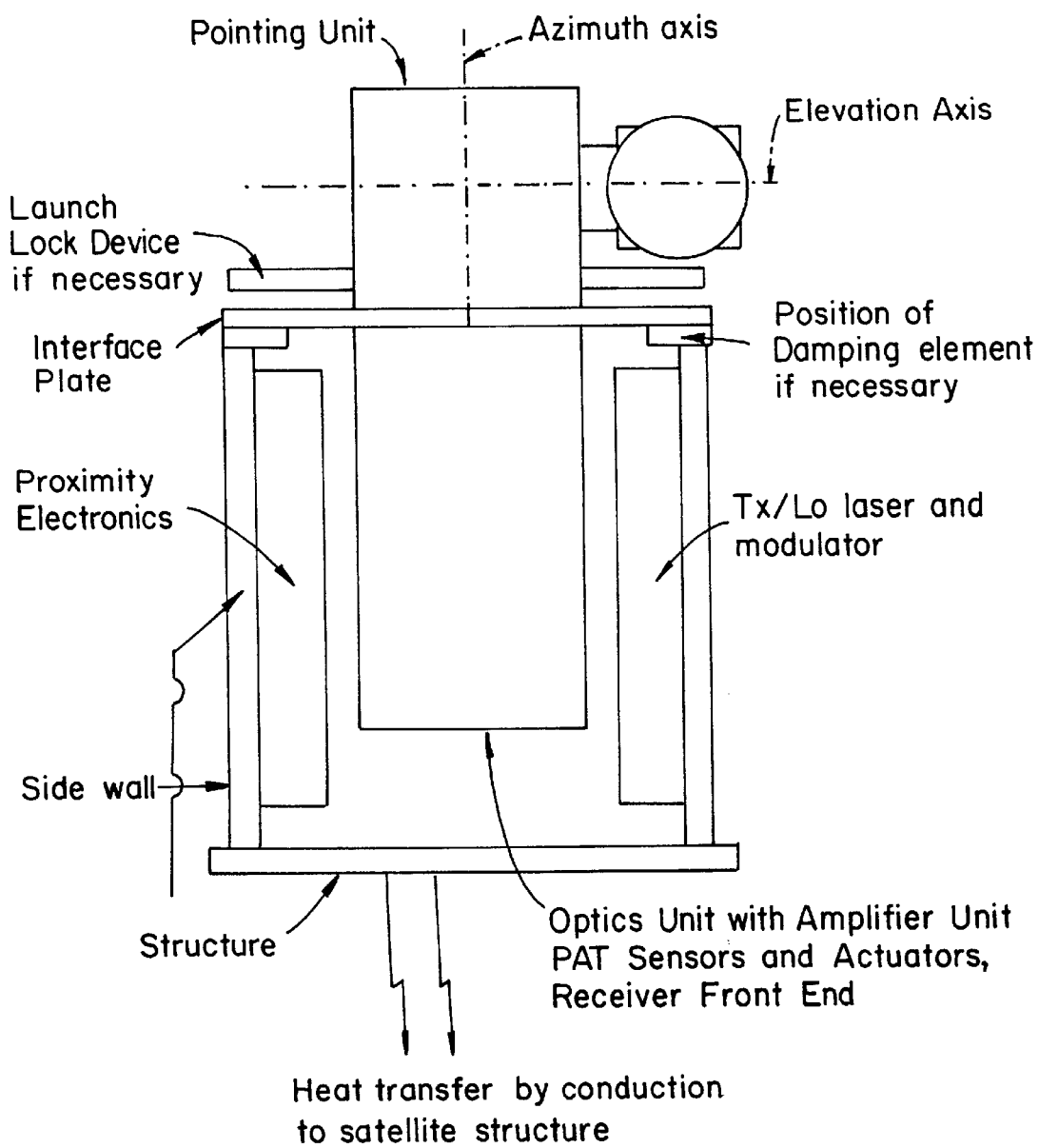
FIG. 7 shows the schematic structure of an optical head, such as used in accordance with the invention.

As FIG. 7 shows, a terminal consists of the miniaturized optical head and the electronic unit connected to it. The configuration of the optical head contains the following units and arrangements:

Laser and optical modulator
Optical amplifier
Optical unit
Sensors for pointing (PAS), acquisition (AS) and tracking (TS)-PAT-, comprising a first electronic sensor evaluation device, wherein the tracking sensor is combined with the receiver input (RFE)
PAT actuators for the pointing device (PAA) and receiver mirror (FRM)
Receiver input with electronic pre-amplifier device
Device for thermal control.

The PAT actuators are described in detail and represented in exemplary embodiments in Swiss patent application No. 2987/96. The optical head is modularly designed and contains the laser unit, which is closed in itself and separate, optical coupling elements and fibers, a stable optical bench with optical and opto-electronic components, and the electronic pre-amplifier device. The optical bench is closed off by a glass front plate (in this connection also see FIG. 11), which itself is fixed on the transition plate. The receiving aperture is kept smaller than 40 to 50 mm. The effects of possible mechanical structural changes are minimized in that the sensors PAS, AS and RFE, as well as the PAA and FRM elements, are directly mounted on the optical bench. The laser sources and the modulator are mounted on the lateral wall in order to assure a good thermal conduction to the satellite structure. The electronic pre-amplifier device is also affixed to the lateral wall, but is arranged to be thermally independent to the greatest extent from the laser sources and the modulator. The entire system can be placed into a housing, wherein a launch lock mechanism is provided, by means of which the entire terminal can be separated from the satellite.

However, provided the system is dynamically balanced, this lock mechanism can be omitted.

Figure 8:
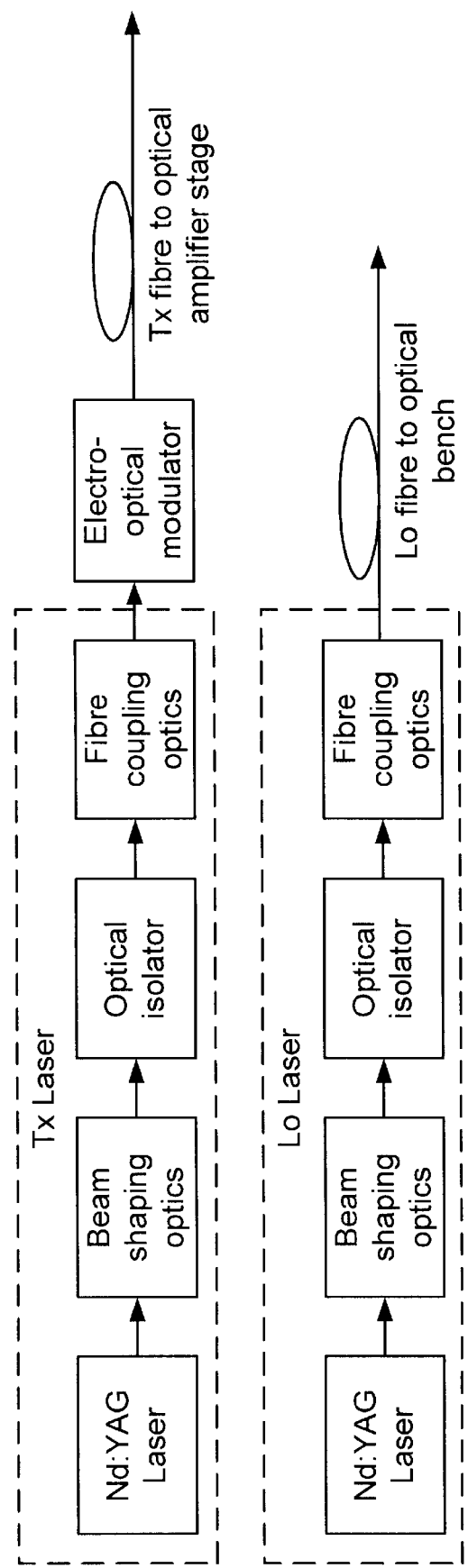
FIG. 8 is a schematic block wiring diagram of a laser unit in accordance with the invention.

The laser sources for the transmitter (Tx) and the local oscillator (Lo) are combined into their own logical unit, which also has an electro-optical modulator, optical insulators, optical beam shaping devices and polarization-sustaining optical fibers, as represented in FIG. 8.

Here, too, the solution in accordance with the invention has its effect, because the laser unit contains an optical technology whose dependability has already been tested, such as a laser-pumped neodymium-YAG laser, for example, with an emission wave length of 1064 nm, in a compact, miniaturized design. The employment of optical fibers increases the efficiency of the system, brings about the required flexibility in design and assures dependability.

Furthermore, a further essential element in accordance with the invention is the use of an optical amplifier, such as the one described in detail in Swiss patent application No. 3146/96, which allows an increase of the radiated optical laser output to the required level.

Figure 9:
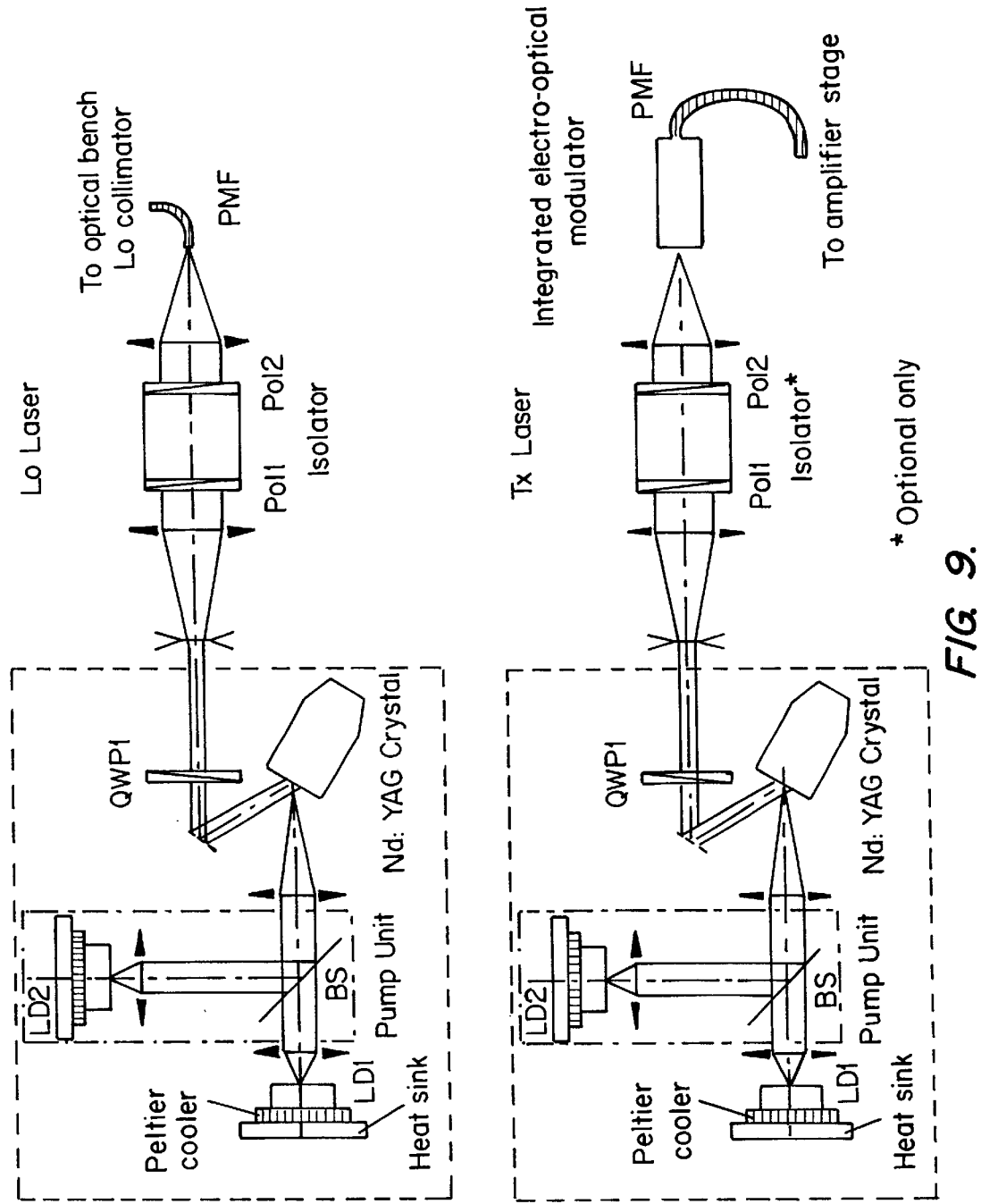
FIG. 9 is a schematic basic circuit diagram of a transmitting laser combined with a local oscillator.

FIG. 9 represents a schematic block wiring diagram of a transmitting laser combined with a local oscillator. As can be seen from the block wiring diagram, the optical system design was optimized in respect to the greatest performance, miniaturization, long-term stability, minimization of the number of interfaces, modularity, replaceability and efficient fabrication.

Figure 10:
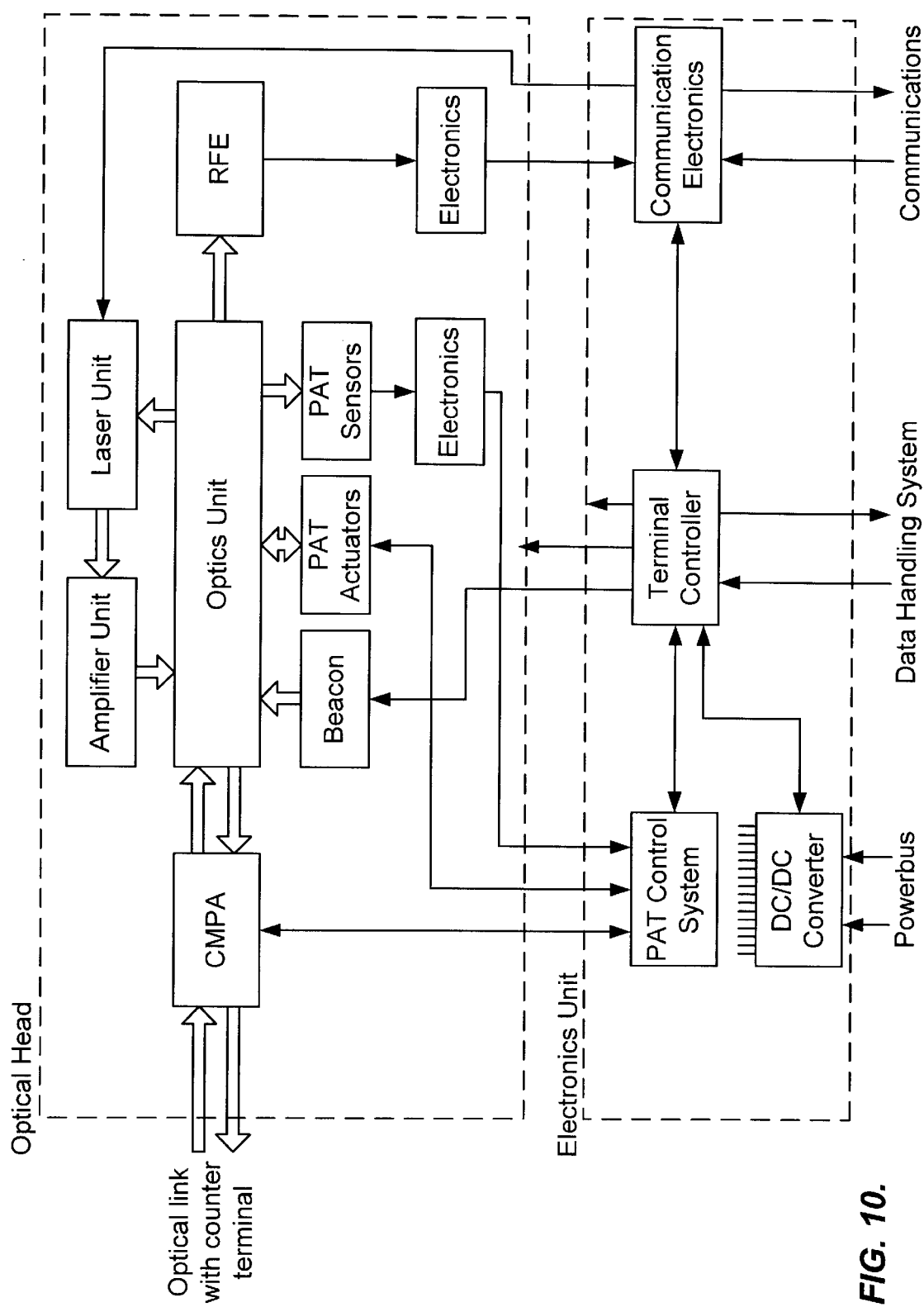
FIG. 10 is a block diagram of the optical head and the electronic unit.

FIG. 10 represents the electronic unit of the terminal, together with a block diagram of the optical head. This unit contains the actual electronic device for communication, which provides signal processing of the laser transmitter and the signals received from the partner satellite.

The new satellite generation for communications applications requires a broad-band signal modulation and demodulation on board, in contrast to the conventional relay techniques. Here, the design in accordance with the invention marks an important step because of the employment of coherent homodyne receiving technology, wherein the optical fibers of the incoming signal and of the neodymium-YAG laser local oscillator are superimposed on each other and conducted to the detector. By means of this the information transmitted by the optical carrier is mixed down to the base band. The phase shift modulation (BPSK) used permits a gain in sensitivity by more than 10 dB at bit rates of Gbit/s in comparison with the methods of direct detection otherwise customary in optical transmission technology which, in case of satellite communications, has a favorable effect regarding the BER, or respectively the covered distance.

Figure 11:
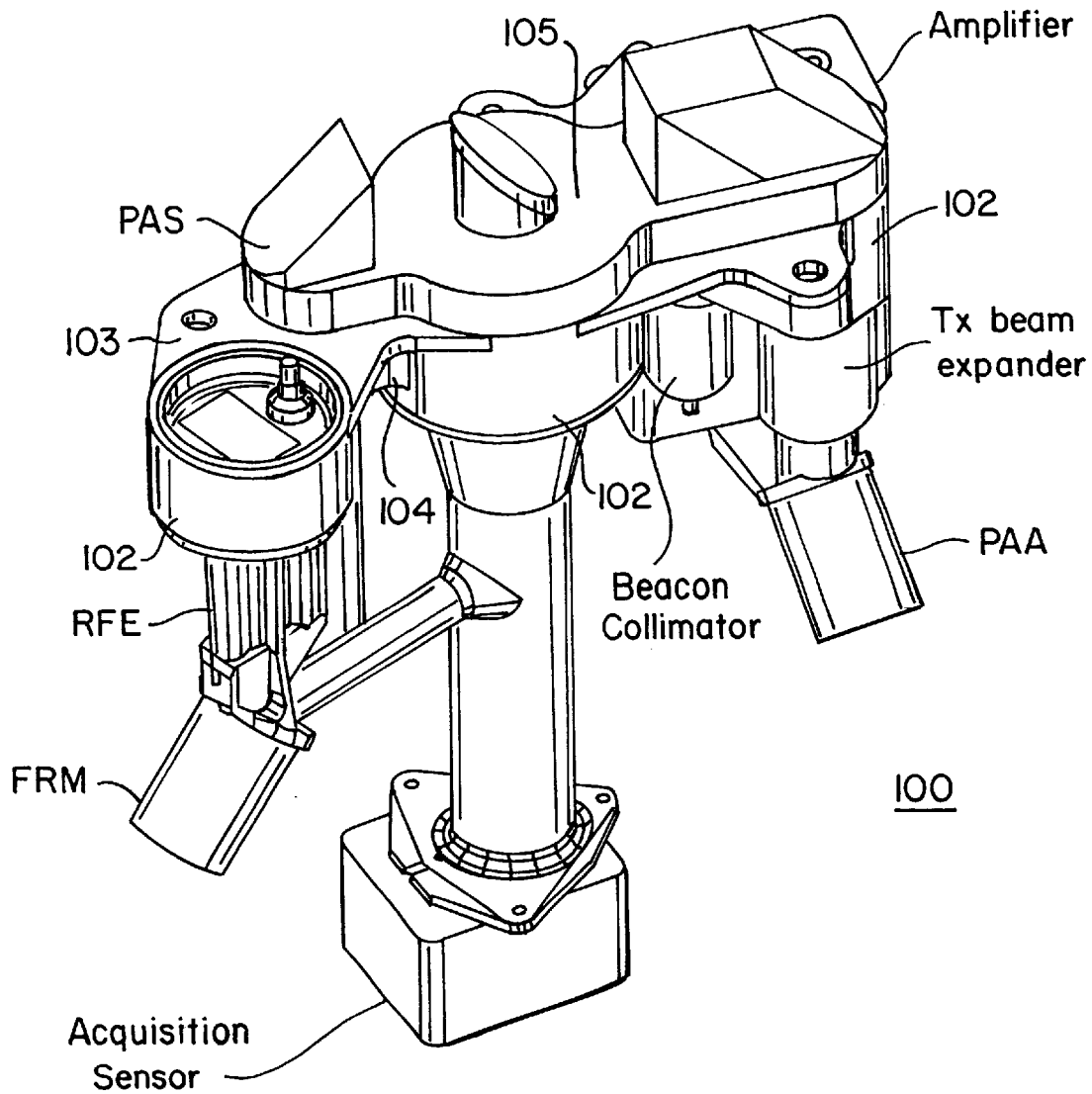
FIG. 11 is a structural view of the optical bench.

The optical bench 100 represented in FIG. 11, which incidentally has been described in detail in Swiss patent application 2897/96, has several optical units, namely an acquisition sensor, RFE, a Tx beam expander and a beacon collimator. The optical units are arranged on a bench structure 100.

Each one of the optical units has been received with its end sections, which is at the top in FIG. 11, in a receptacle element 102 of the bench structure 100, wherein the axes of the acquisition sensor, the RFE, the beacon collimator and the Tx beam expander are oriented parallel, so that the optical bench 100 is suitable for processing collimated radiation. The optical units are only connected with each other via their receptacle elements 102 and the bench structure 100, while they independently project away from the bench structure 100 with their lower ends, located at the bottom in FIG. 11.

As already mentioned, the bench structure 100 has the receptacle elements 102. These are arranged on a thin plate 103 of the bench structure 100, which is oriented transversely in respect to the mentioned parallel axes of the optical units.

Also for simplifying the entire optical bench, it is provided in a variant to directly connect the beacon with the elevation mechanism, instead of seating it in the optical bench.

Ribs 104, only one of which is visible, projecting away from the plate 103 extend between the receptacle elements, all of which are identified by 102.

It can also be seen in FIG. 11, that a radiation shielding plate 105 is arranged on the side of the plate 103 opposite the optical units, which extends parallel with the plate 103 and therefore orthogonally in respect to the said parallel axes of the optical units, and which covers the area of the optical units arranged under it and shields them from high-energy radiation.

The following explanations not only apply to the above described example of an optical bench, but relate in general to optical benches which can be employed within the framework of the instant invention. Such optical benches are designed in such a way that the optical units are only received in the receptacle elements for the latter associated with the bench structure in a comparatively short end section, while over the entire remaining length they have no further mutual connection, so that individually they project transversely from the bench structure. In this case the optical units can, starting from the receptacle elements, be expanded independently of each other, because of which their bending is prevented to a large extent, so that the parallel and unchanged orientation of the axes is sufficiently assured, such as should be the case for the employment of the optical bench within the framework of the instant invention.

The bench structure itself can take on various shapes; it is essential that it is designed in such a way that temperature gradients, and therefore heat flows, or respectively heat expansion, result only within the bench structure, i.e. in the direction from its main extension, and therefore transversely to the axes of the optical units. Because of this it might possibly have to be accepted that the mutual distances of the optical units are slightly changed, but the parallelism of these axes is maintained. p The thin, almost two-dimensional plate of the bench structure is made of a material with high heat conductivity. In an advantageous embodiment the thickness of the plate lies in the range between 5 and 20 mm. Such a plate has essentially the same temperature at each location over respectively its entire thickness, so that temperature gradients, heat flows and expansions only result in the plate level itself, so that bending of the plate and therefore tilting of the optical units is prevented.

The almost two-dimensional plate is preferably prepared for flanging to the alignment unit by means of solid body hinges (not shown for the sake of clarity).

Aluminum, or respectively suitable aluminum alloys, with a relatively high heat conductivity, low specific weight, problem-free processing and a comparatively advantageous price, has been shown to be an advantageous material for the bench structure.

The radiation shielding plate provided for a shielding against high-energy radiation must not hamper the parallel arrangement, fixed in its direction, of the axes of the optical units and therefore must be attached in such a way that with possibly thermally caused tilting out of the plate plane, the mutual angular position of the optical units and the direction of their axes relative to the bench structure is maintained, if possible.

To this end, the mutual fastening of the radiation shielding plate and the bench structure can be an elastic fastening and, if required, the radiation shielding plate should be arranged at a distance from the bench structure which at least corresponds to the maximal tilting to be expected of the radiation shielding plate in the direction towards the bench structure. A suitable mutual fastening of the bench structure and the radiation shielding plate consists in the use of an elastic adhesive material in spots, such as silicon, by means of which some shear can be absorbed.

It is particularly advantageous if further optical units arranged on the radiation shielding plate, in particular for collimated coinciding incoming and outgoing light beams, are arranged in such a way, that an automatic correction occurs if the shielding plate is tilted, because of which the coincidence of the incoming beam with the outgoing beam is maintained.

In connection with the dimensioning of the individual components of the optical bench and its connections, it is necessary to take into consideration the stresses on them, not only during their actual employment in space, but also during the start phase of the carrier rocket.

Figure 12:
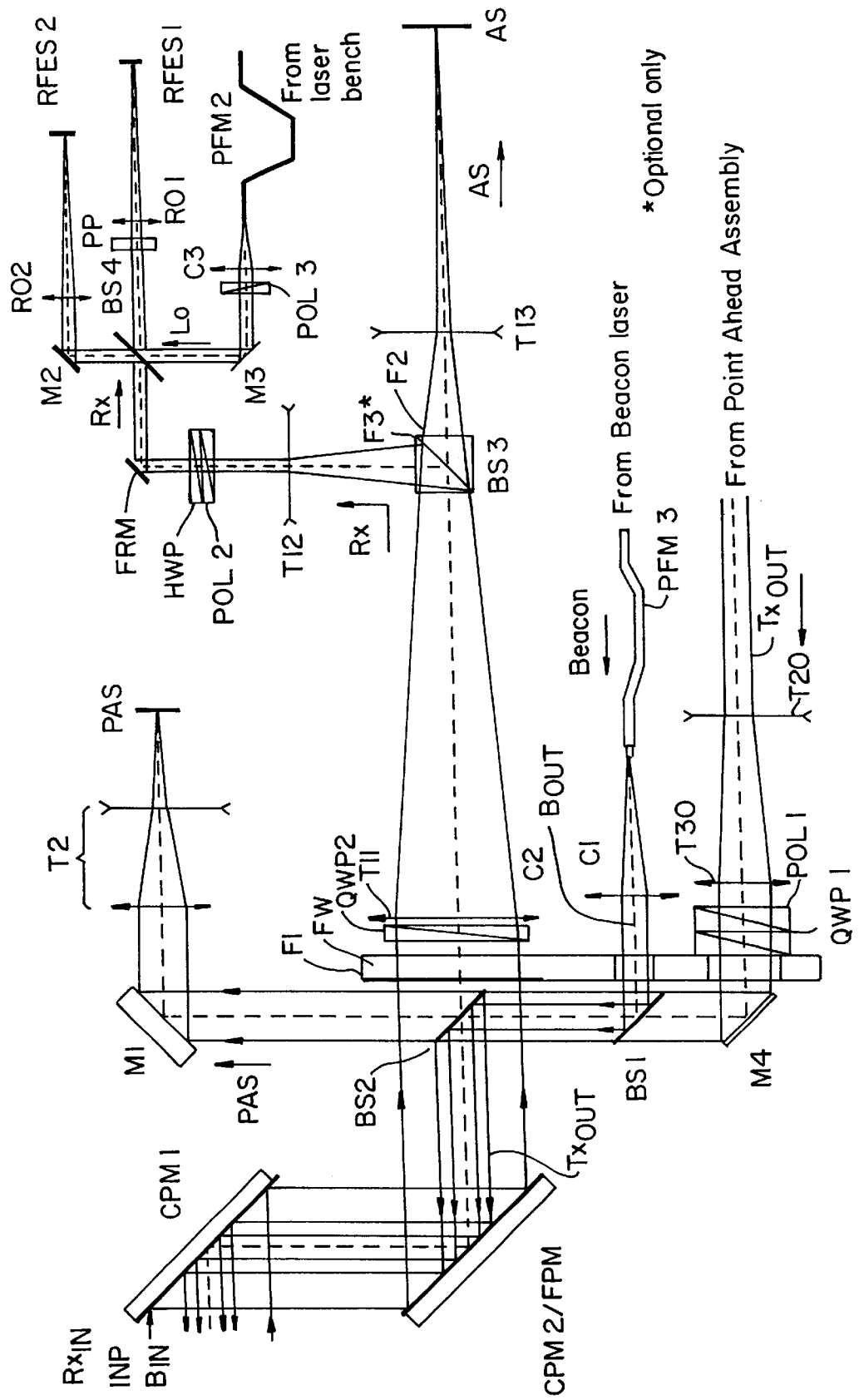
FIG. 12 shows the schematic structure of the mode of operation of the optical bench.

The entire optical system is represented in FIG. 12 (also see Swiss patent application No. 2905/96).

A light beam Rxin, or respectively Bin is cast by a counter-station on the first of two mirrors CPM 1 and CPM 2, which are arranged periscopally in respect to each other and which, rotated by electric servo motors, can catch light beams from a full hemisphere. The rough alignment of the light beams Txout and Bout, which are to be transmitted in the direction of the counter-station, also takes place via the same arrangement of mirrors. For controlling the light beam received from the counter-station, as well as for controlling the light beam transmitted to the counter-station, the mirror CPM 2 can be moved with increased precision. After the two mirrors CPM 1 and CPM 2, the light beam Rxin, or respectively Bin passes through an optical filter F1 applied to a quartz glass plate FW acting as support. Because of the front-connected optical filter F1, the quartz glass plate FW is only transparent to beams in the wavelength range of the light beams Rxin, or respectively Bin. By means of polarized light of the light beam Rxin, or respectively Bin into light with linear polarization in a defined direction. A collecting lens T 11 focuses this light in the direction of a beam splitter BS 3, which divides the two beams Rxin, or respectively Bin in accordance with the wave length in the direction from the lenses T 12 and T 13. Incidentally, T 12 can also be designed as a collecting lens, in that case this optical element acts in the manner of a Keppler telescope. After passing through the lens T 13, the light beam Bin is cast on a planar arrangement AS of adjoining light-sensitive elements, which provide an associated control system with the exact actual state of the incoming light and by means of this make automatic corrections by means of the mirrors CPM 1 and CPM 2 as actuators possible during the acquisition phase. The light beams Rxin deflected at the beam splitter BS 3 optionally passes through a further scattering lens T 12, a polarizing filter POL 2 and a half-wave plate HWP (in a simplified version, the last two elements can also be omitted) in order to be subsequently deflected by a mirror FRM, the angle of which can be adjusted with high precision and speed and which, besides the mirror CPM 2, represents a further means for the precise alignment of the received light beam Rxin. The light beam passes through a further beam splitter BS 4, from which two light beams with respectively one-half the optical output of the light beam entering the beam splitter BS 4 result. These pass directly and after deflection by a further fixed mirror M 2 through the collecting lenses RO 1 and RO 2 in order to be cast on two double detectors RFES 1 and RFES 2, which are aligned orthogonally in respect to each other.

A path length compensation is performed by means of a parallel plate PP. The compensation is performed in relation to the group velocity Lω.

Light from a polarization-maintaining optical waveguide PFM 2 of the same optical frequency as that cast by the received light beam Rxin on the double detectors RFES 1 and RFES 2 is collimated by a collector lens C 3 and, after passing through a polarizing filter POL 3, is also cast via a fixed mirror M 3 and the beam splitter BS 4, superimposed in the same polarization direction on the received beam, on the two double detectors RFES 1 and RFES 2. Optical filters F3 and F2, which can be placed into the partial beams resulting from the beam splitter BS 3, should also be mentioned.

Light from a high-output light source, which is supplied via a further optical waveguide PFM 3, is collimated by a collecting lens C 1 and is conducted as light beam Bout through a bore of the quartz glass plate FW to a beam splitter BS 1 which ideally completely deflects the light beam Bout because of its special wavelength. The bore in the quartz glass plate FW is required in order to prevent by means of it the spreading of scattered light into the path of the bore of the quartz glass plate FW to a beam splitter BS 1 which ideally completely deflects the light beam Bout because of its special wavelength. The bore in the quartz glass plate FW is required in order to prevent by means of it the spreading of scattered light into the path of the received light beam Rxin, or respectively Bin radiating through it. The beam splitter BS 2 deflects the light beam Bout completely in the direction of the periscopic arrangement consisting of the mirrors CPM 2 and CPM 1. An emission from an optical transmitter supplied as a collimated light beam Txout is first expanded by an arrangement consisting of the lenses T 20 and T30, and sent through a polarizing filter POL 1 in order to subsequently undergo a conversion from linear to circular polarization in a quarter-wave plate QWP 1. Through a further bore in the quartz glass plate FW, the light beam Txout, uncoupled from the received light beam Rxin, or respectively Bin, reaches a fixed mirror M 4, which reflects it in the direction of the beam splitter BS 1. The light beam Txout which, because of its assigned wavelength, has passed through the beam splitter BS 1 straight and with small loss, is deflected by the beam splitter BS 2 to the greatest part in the direction of the periscopic arrangement consisting of the mirrors CPM 2 and CPM 1. A small portion of the optical output of this light beam passes in a straight line through the beam splitter BS 2 in the direction of a mirror M 1, which directs the light beam onto a telephoto system T 2, consisting of a collection lens as well as a scattering lens, in order to be cast, after having passed it, on a planar arrangement PAS of light-sensitive sensors. These have the task of detecting the actual value of a leading angle, at which the light beam Txout must be radiated in relation to the direction of the received light beam Rxin in order to compensate the combined effects of the running time of the transmitted light beam to the counter-station, thus its angular velocity.

The requirements in the various phases over the length of the satellite life, including the start phase, are met by a series of coherent operational modes of the terminal in accordance with the invention.

A further variant consists in that a single light beam Inp is used in place of the two light beams Rxin, or respectively Bin.

Figure 13:
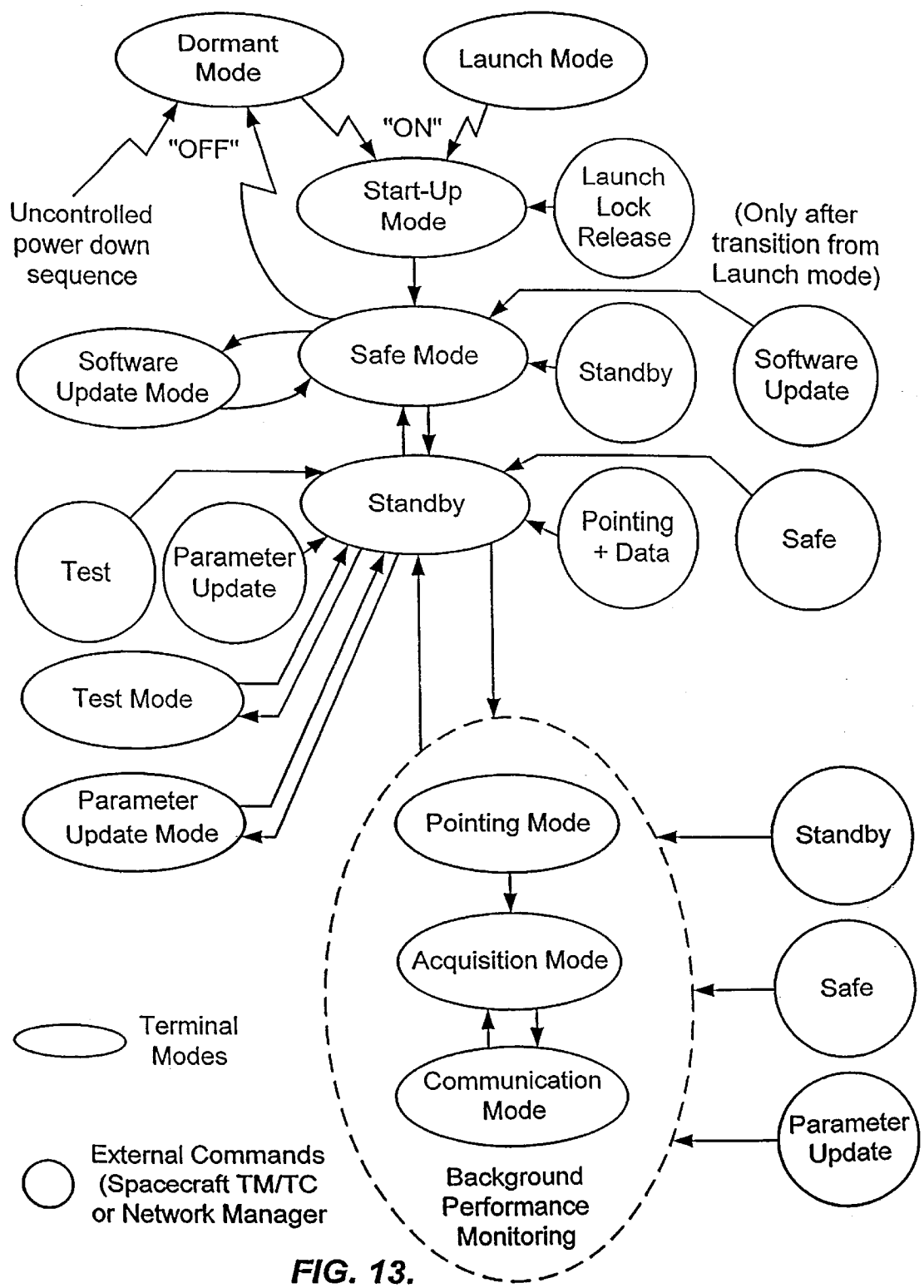
FIG. 13 is a sequence representation of the operational modes of the terminal in accordance with the invention.

In FIG. 13, a software concept by means of these modes shows their effects and interrelations. They see to maximum operational dependability, highest flexibility and optimal compatibility with the host space capsule. They permit, in combination with the optical devices, the assured localization of the partner satellite and the activation of the communication channels. Hardware and software are designed in such a way that it is possible at any time to understand and execute actualization commands, and all this with minimal power requirements.

The modes of operation of the terminals in particular constitute the basis for designing the modes of operation of the sub-systems.

A monitoring program acts in the background of the various modes of operation. It monitors the operation of all sub-systems of the terminal and detects falling output parameters or error functions, which cannot be handled by the respective sub-system. Furthermore, defined functions of the counter-terminal are monitored, for example changes in the characteristics of their orbits, their behavior during acquisition and the change in their signal strength.

The results of monitoring are evaluated and stored in a monitoring data file. As will be described further down below, this monitoring data file can be called up while the terminal is in the parameter tracking mode.

An error marker is placed in the data flow of the terminal when an error function or a degradation of an operational parameter is noted, which could lead to a fatal error of the terminal or of the satellite communication network. A complete error message follows this marker. Special behavior of the counter-terminal can cause an autonomous reconfiguration, which can be authorized or prevented by ground commands.

The different types of operation, or respectively modes of the optical terminal, will be described in more detail in what follows, making reference to FIG. 13. These types of operation, or respectively modes, correspond to the requirements made on the terminal during the various phases of its service life in space, including the launch phase. The modes, the provided switching possibilities between the modes, and the possibilities of affecting the modes by external commands, are represented in the block diagram shown in FIG. 13. In this case each mode is represented as an oval block, and each external command as a round block, the arrows between the modes show in which direction a mode change can take place, and the arrows from the external commands to the modes show in which mode a command can be received and executed.

In cases where the terminal is a component of a larger communications network, the external commands can be issued either by a network system, which performs the control of the respective network functions, or the external commands come through the satellite TM/TC sub-system from the ground command post.

In accordance with FIG. 13, the terminal is in the launch mode during the period of the launch of the carrier rocket, the subsequent phase of positioning the carrier rocket in orbit and the separation of the carrier rocket. During this time it is not connected to the main line of the carrier rocket. The thermal control system of the carrier rocket must keep the terminal at a temperature within the temperature range provided when the terminal is not actually in use. The launch locking devices of the pointing unit are locked, so that the pointing unit is maintained in a secure position. In this position the input of the pointing unit, which possibly could be covered, and the opening of the optical systems cannot be directly exposed to sunlight, and they are protected against soiling by particles or other dirt stemming from the carrier rocket or the launch system. The terminal can remain in the launch mode for an arbitrary length of time. When the system is switched on, the terminal gets into the start-up mode, in which a provision is made for issuing the external command for disengaging the launch lock devices (launch lock release). A return into the launch mode is not possible from either the start-up mode or any other mode.

Prior to a more detailed description of the start-up mode in which the terminal now is, the dormant mode will be discussed. In the dormant mode the terminal is not connected with the Main line of the satellite. If a scheduled switch-off has taken place, the pointing unit is essentially in the same position as during the launch mode, however, the locking devices are released. The thermal control system of the satellite must keep the terminal at a temperature within the temperature range provided when the terminal is not actually in use.

In accordance with FIG. 13, the terminal can return from the safe mode, to be described further down below, into the dormant mode without problems in a specified situation, so that there is the assurance that the pointing unit is in the above described secure position and that a predetermined system shut-off has taken place. In a situation other than a specified situation, when the terminal has been shut off without having actually been powered down, the pointing unit might not be in its secured position and it would then be possible for sunlight to enter its opening. The optical terminal can remain in the dormant mode for an unlimited period of time.

In the start-up mode, the release of the locking devices which are effective during the launch phase of the carrier rocket, takes place by means of an external command "launch lock release" under the nominal control by the ground station, when the system is switched on for the first time and initialized. This command "launch lock release" is only issued if the terminal has reached the start-up mode from the launch mode, because if the start-up mode has been reached from the dormant mode, release had already been accomplished. As mentioned further up above, it is not possible to return back to the launch mode from any other mode after release of the locking devices effective during the launch phase of the carrier rocket. The terminal control is activated during the start-up mode, the system is initialized and self-test functions take place.

If the terminal has reached the start-up mode from the launch mode, the terminal control must remain in the start-up mode until the command "launch lock release" for releasing the launch lock is received from the host system. Following arrival and execution of this command, the terminal control will go over into the safe mode.

If the terminal has reached the start-up mode from the dormant mode, a direct change into the safe mode is made after initialization and the self-test functions have ended.

A return from the safe mode to the start-up mode is in any case only possible via the detour through the dormant mode.

In the safe mode the thermal control of the terminal, i.e. of the optical and electronic units, is performed by means of the terminal control, wherein the temperature of the terminal is maintained in the temperature range of the start-up mode. The terminal assures that the pointing unit CMPA is in its safe position.

The safe mode is a low output mode, in which the terminal can remain for an unlimited length of time.

In the safe mode the terminal can receive and execute the external command "standby", by means of which the terminal is switched into the standby mode.

If the terminal was not switched into the safe mode from the start-up mode, the control checks whether the state of the system has been brought to low output.

In order to perform a specified shut-off of the system from any mode, it is necessary in every case for the terminal to be placed in the safe mode so that it is assured that secure conditions prevail in the terminal.

If the satellite power supply is switched off in the safe mode, the terminal returns to the dormant mode.

While the terminal is in the safe mode, a software update can be performed by means of an external command. Since the general program execution must be stopped during a software update, the system must be in a secure configuration during each software update.

If an external command for a software update has been issued, the terminal is initially switched from the safe mode into the standby mode. Both the software of the terminal control and the PAT control can be updated. New software routines or blocks are loaded from the ground station via the external satellite interface for replacing software routines of the original software of the terminal. As soon as replacing of the one or the other software is finished, the terminal returns from the software update mode to the safe mode.

In order to assure the operation of the system with the updated software, a test of the terminal functions can be performed. To this end, commands are issued for switching from the safe mode into the standby mode and further from the standby mode into the test mode. Following the end of the test, the terminal returns from the test mode into the standby mode and there awaits the next external command.

The already mentioned standby mode can be reached from various other modes. All subsystems of the terminals can be actuated in the standby mode and are ready to receive and execute external commands. The thermal control of both the units and the lasers are operational and the sources of the communication lasers are kept at their standby temperature and are ready for use. The pointing unit CMPA is in the secure position and the coders of all actuators are initialized, so that an acquisition process can be directly performed. When the standby mode has been reached from the safe mode, the system runs through a startup phase prior to meeting the requirements of the standby mode.

If the standby mode has been reached from another mode than the safe mode, the pointing unit CMPA reaches the secured position and the system is powered down sufficiently for reaching the desired mode. This process of powering down also includes a reduction of the laser strength to a minimum.

The optical terminal can remain in the standby mode for an unlimited length of time.

The terminal leaves the standby mode upon one of four possible commands for switching to another mode, as represented in FIG. 13. The external commands are the command "safe" for switching into the safe mode, the external command "test" for switching into the test mode, the external command "pointing+data" for switching into the pointing mode and the external command "parameter update" for switching into the parameter update mode. The pointing mode can only be reached from the software update mode upon the external command "pointing+data". Simultaneously with the mentioned external command "pointing +data", the terminal receives a set of data comprising 1. Parameters of the orientation status of the carrier vehicle,
2. Track elements of the carrier vehicle,
3. Track elements of the counter-terminal,
4. Connection time, and
5. Actual time by means of synchronization signals.

Following receipt of the command, both the beacon laser and the two connecting lasers, i.e. the transmitter and the local oscillator, are switched in such a way that they reach stable operating conditions required for acquisition.

From the values received simultaneously with the external command "pointing +data", the PAT processor starts to calculate the azimuth and elevation angles for the pointing unit CMPA, which are expected for the connection time t; furthermore the angular values for tracking the target and the required angles of lead are calculated. The pointing unit CMPA aims toward the calculated position of the counter-terminal and starts to follow it by means of angular values resulting from the calculation. As soon as the terminal has reached this state, an automatic switch from the pointing mode into the acquisition mode is made. The pointing process is finished in a specified time of less than 20 seconds after receipt of the external command "pointing +data".

While the terminal is in the pointing mode, it can be caused to return to the standby mode by an external command "standby", or, by means of an external command "safe" it can be caused to return to the safe mode. With the command to return to the safe mode, the terminal is first powered down into the standby mode before it is switched into the safe mode.

When entering the acquisition mode, the terminal follows the specified trajectory of the counter-terminal with the beacon laser and the communication lasers. The terminal performs the acquisition of the counter-terminal in the following sequential steps:

1. Detection of the beacon signal from the counter-terminal by means of the acquisition sensor AS, wherein it is also provided for the beacon to perform search movements, if necessary;
2. Rough line-of-sight alignment by means of the pointing unit CMPA;
3. Tracking the beacon signal of the counter-terminal by means of the acquisition sensor AS;
4. Precision line-of-sight alignment by means of the pointing unit CMPA;
5. Continuation of tracking the beacon signal from the counter-terminal by means of the acquisition sensor AS and spatial acquisition of the communication signal by means of the receiver sensors RFES 1 and RFES 2;
6. Enhancement of the precision line-of-sight alignment by means of the pointing unit CMPA and FRM, the receiver mirror and the frequency acquisition of the connection signal;
7. Switching the beacon signal off.

After these seven steps have been performed, the terminal automatically switches from the acquisition mode into the communication mode.

Depending on the connection configuration, the performance of the above described steps for acquiring the counter-terminal are ended in a specified time of less than 15 seconds after receipt of the external command. If it is not possible to successfully perform acquisition in a first cycle, a second acquisition cycle is started. If this second acquisition cycle is also not successful, the terminal switches back from the acquisition mode into the standby mode and emits an error signal to the satellite.

As long as the terminal is in the acquisition mode, the satellite can issue the command "standby" to the terminal for returning from the acquisition mode into the standby mode, or the command "safe" for returning to the safe mode. Upon the command "safe" for returning to the safe mode, the terminal is first powered down into the standby mode before it is switched into the safe mode.

After entering the communication mode, the terminal starts to operate in a mutual connection with the counter-terminal. Tracking is performed by means of the precise alignment unit of the pointing unit in cooperation with the precision receiver mirror, actually based on the received signals.

Depending on the operation of the counter-terminal, the terminal can remain in the communication mode for an unlimited length of time.

As long as the terminal is in the communication mode, the satellite can issue the command "standby" to the terminal for returning from the communication mode into the standby mode, or the command "safe" for returning to the safe mode, or the command "parameter update" for switching into the parameter update mode. Upon the command "safe" for returning to the safe mode, the terminal is first powered down into the standby mode before it is switched into the safe mode.

If the monitoring program detects an anomaly in a connection, such as a reduction in the strength of the received signals or an increased number of errors, a message is sent to the counter-terminal describing the type of anomaly.

If thereupon the connection improves, a corresponding signal is also transmitted to the counter-terminal. As soon as the specified quality has again been achieved, this is reported to the counter-terminal and the connection is continued accordingly.

If the terminal receives a message from the counter-terminal via the optical connection, according to which a deterioration of the connection has taken place, the terminal starts an optimization routine. This optimization routine begins with an increase in the transmission strength to prevent a loss of the connection during the optimization cycle as a result of divergent optimization results. The optimization routine is then continued with a correction routine for the leading angle. The optimization routine follows the status reports received from the counter-terminal. As soon as a message arrives that the status of the connection has been improved to the specified value, the optimization routine is stopped and the strength of the laser is again reduced to its specified value. The measured deviation parameters are used for updating the PAT algorithms.

If the connection should be lost, the terminal starts the beacon laser and switches from the communication mode into the acquisition mode, because of which the acquisition routine is started. Should it not be possible to reacquire the counter-terminal in this acquisition cycle, the terminal switches from the acquisition mode into the standby mode, transmits a message to the satellite and awaits the next command from the satellite.

A self test of all functions of the terminal takes place in the test mode, which can only be reached from the standby mode. This self test can include different individual tests.

A first group of individual tests relates to the control of the terminal, namely:

1a: a bit-wise RAM test;
1b: a control sum test for ROM;
1c: a timer test;
1d: a CPU test;
1e: an S/C interface test;
1f: a function and performance test of the supporting equipment (for example the thermal control system with its components, power converter);
1g: the initialization of self test sequences of PAT and connections S/S.

A second group of individual tests includes the PAT sub-system, including:

2a: a bit-wise RAM test;
2b: a control sum test for ROM;
2c: a timer test;
2d: a CPU test;
2e: a function and performance test with CMPA, FRA, PM, PAS, AS;
2f: a coder initialization;
2g: a dark charge calibration of AS;
2f: a function and performance test of the beacon laser.

A third group of individual tests relates to tests of the communication sub-system, such as:

3a: the laser operational parameters;
3b: a test of the character generation and analysis.

As already mentioned, the test mode can only be reached from the standby mode, actually by the external command "test".

The lasers are brought to their specified level during the test mode. The entire testing process takes place in approximately 120 seconds. The test results are stored in a test data file, to which access can be had by means of an external device for analyzing the test results and fot taking required steps, if necessary. At the termination of the test mode the terminal again returns into the standby mode.

The parameter update mode is reached by means of an external command "parameter update", actually always from the standby mode. If at the minute the external command "parameter update" is issued, the terminal is not in the standby mode, but in the communication mode, an intermediate switch into the standby mode takes place. An internal optimization of the routines can be performed in the parameter update mode.

The terminal evaluates the values which, as described above, were determined by the monitoring program and were stored in the previously mentioned monitoring data file. A parameter update table is drawn up on the basis of the results of this evaluation. This parameter update table is transmitted via an external interface for approval. The new parameter set is loaded after the external approval has been received.

Upon completion of the parameter update, the terminal returns from the parameter update mode into the standby mode. In order to test the effect of the entire system when using the new parameters, a test can then be performed; to this end, the external command "test" is issued, by means of which the terminal is switched into the test mode. At the conclusion of the test, the terminal returns from the test mode to the standby mode.

Figure 14A:
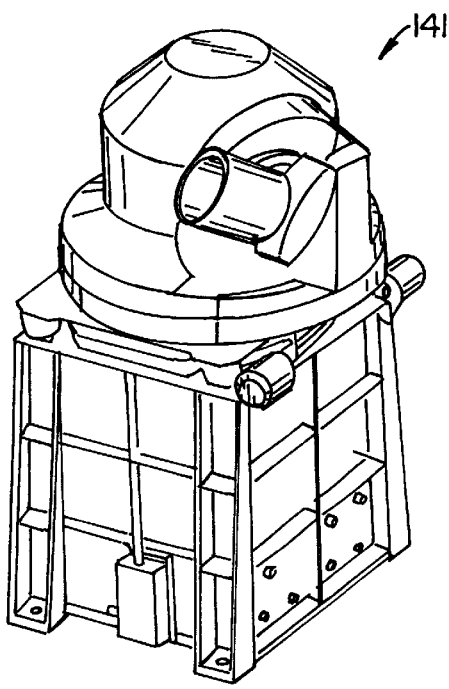
FIG. 14 is a total representation of the terminal in accordance with the invention.
Figure 14B:
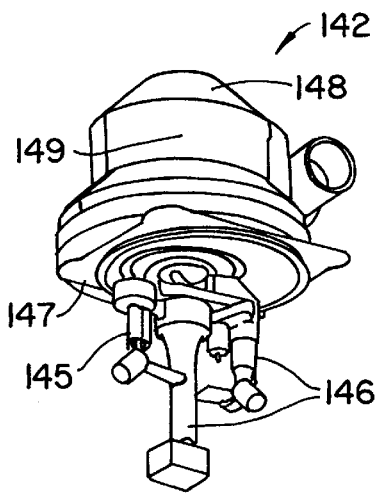
Figure 14D:
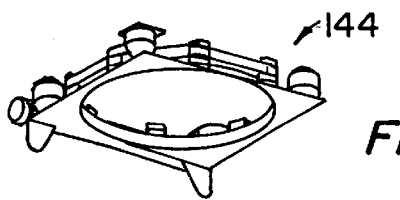
Figure 14C:
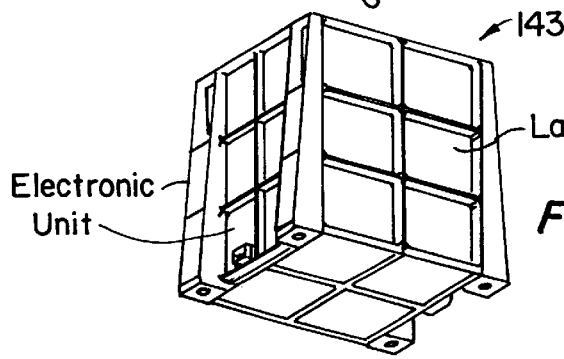

An aggregate optical unit 141, at times also called an optical head, is represented in FIG. 14A, which comprises an optical unit 142 in accordance with FIG. 14B, a support unit 143 in accordance with FIG. 14C, and an optical suspension 144 in accordance with FIG. 14D, wherein the optical suspension 144 constitutes the connection between the optical unit 142 and the support unit 143.

The optical unit 142 itself includes an optical bench 145, such as has been described above in connection with FIG. 11. The optical bench has several individual optical units 146 with parallel axes fastened on a bench structure 147. A casing 148 is located above the optical bench 145, in which a pointing, or respectively alignment device as well as sensors and lasers, which can be brought into position by it, are arranged. The pointing, or respectively alignment device makes it possible to set, or respectively to change the azimuth angle and the elevation angle. For changing the azimuth angle, a rotation takes place in relation to the optical bank around an axis 149, which in FIGS. 14A to 14D is vertically oriented, and which therefore is parallel with the axes of the individual optical units 146. This adjustment of the azimuth angle, as well as the setting of the elevation angle have been described in more detail above in connection with FIG. 6. An actuator device, or respectively a drive for the said relative rotation of the pointing device are also located in the casing 148. Furthermore, a locking device is provided, by means of which the relative rotation can be blocked during the launch and positioning phase of the carrier rocket.

The support unit 143 is connected via the optical suspension 144 with the optic unit 142 and has been described in more detail above in connection with FIG. 7. The support unit 143 consists of an approximately cuboid housing with four lateral walls and a base or respectively structural plate. This housing contains electronic devices and laser devices, which are arranged inside the housing at a distance from each other, in particular for protecting the electronic devices against harmful effects of the temperature fluctuations caused by the laser devices. In the assembled state the individual optical units of the optical bench project into the housing. The base or respectively structural plate has high heat conductivity.

What is claimed is:

1. A satellite device for optically transmitting and receiving information between satellites comprising:
 a beacon laser for transmitting a remote satellite locating search beam;
 a point ahead assembly laser for transmitting information to said remote satellite once said remote satellite has been located by said beacon laser;
 a pair of initial, movable mirrors for selectively directing said beacon and point ahead assembly lasers out of said satellite device and for selectively directing superimposed optical beams which are received by said satellite device;
 a plurality of detectors for detecting beams received by said satellite device through said pair of initial, movable mirrors;
 an arrangement of one or more internal mirrors and beam splitters for routing said received optical beams to appropriate detectors once said received beams have passed through said pair of initial, movable mirrors.

2. The satellite device of claim 1 wherein said received optical beams are passed through polarizing optical filters.

3. The satellite device of claim 1 further comprising an amplifier for said point ahead assembly laser.

4. The satellite device of claim 3 wherein said point ahead assembly laser is a diode laser and said amplifier is a semiconductor amplifier.

5. The satellite device of claim 1 wherein the longitudinal axes of said beacon laser and said point ahead assembly laser extend parallel to each other.

6. The satellite device of claim 1 wherein said point ahead assembly laser includes an Nd:YAG laser, beam shaping optics, an optical isolator, fiber coupling optics and an electro-optical modulator.

7. The satellite device of claim 1 where said point ahead assembly laser transmits data at a rate between 100 Megabits per second and 1.5 gigabits per second.

8. The satellite device of claim 1 further comprising a radiation shielding plate.

9. The satellite device of claim 1 wherein the exterior of said device is made from aluminum or aluminum alloy.

10. The satellite device of claim 1 wherein said pair of initial, movable mirrors are parallel and move in unison.

* * * * *